(12) United States Patent
Deutsch

(10) Patent No.: US 9,125,380 B2
(45) Date of Patent: Sep. 8, 2015

(54) SYSTEMS AND METHODS FOR MONITORING AND CONTROLLING ANIMAL BEHAVIOR

(71) Applicant: Richard Deutsch, Raleigh, NC (US)

(72) Inventor: Richard Deutsch, Raleigh, NC (US)

(*) Notice: Subject to any disclaimer, the term of this patent is extended or adjusted under 35 U.S.C. 154(b) by 0 days.

(21) Appl. No.: 14/282,023

(22) Filed: May 20, 2014

(65) Prior Publication Data

US 2014/0251234 A1    Sep. 11, 2014

Related U.S. Application Data

(60) Provisional application No. 61/855,781, filed on May 22, 2013.

(51) Int. Cl.
*A01K 15/02* (2006.01)
*A01K 29/00* (2006.01)

(52) U.S. Cl.
CPC .............. *A01K 15/021* (2013.01); *A01K 29/005* (2013.01)

(58) Field of Classification Search
USPC ......... 119/712, 719, 720, 721, 856, 858, 859, 119/908; 340/573.3, 573.1, 573.4, 686.1
See application file for complete search history.

(56) References Cited

U.S. PATENT DOCUMENTS

| | | |
|---|---|---|
| 2,634,409 A | 4/1953 | Walcher |
| 3,084,554 A * | 4/1963 | Perilloux ................... 73/863.73 |
| 3,734,057 A | 5/1973 | Lee et al. |
| 4,400,696 A | 8/1983 | Klingensmith |
| 4,574,735 A | 3/1986 | Hohenstein |
| 4,969,418 A | 11/1990 | Jones |
| 5,048,465 A | 9/1991 | Carlisi |
| 5,061,918 A | 10/1991 | Hunter |
| 5,214,411 A | 5/1993 | Herbruck |
| 5,303,677 A | 4/1994 | Jones |
| 5,475,369 A | 12/1995 | Baker |
| 5,604,478 A | 2/1997 | Grady et al. |
| 5,901,667 A | 5/1999 | Kallas |
| 5,931,119 A | 8/1999 | Nissim et al. |
| 5,952,926 A | 9/1999 | Syverson |
| 6,606,030 B2 | 8/2003 | Vena |
| 7,278,372 B2 | 10/2007 | Colsky |
| 7,426,901 B2 | 9/2008 | Turner et al. |
| 7,511,626 B2 | 3/2009 | Siegmann et al. |
| 7,816,676 B2 | 10/2010 | Fourst et al. |
| 8,028,659 B2 | 10/2011 | Cook et al. |
| 2007/0028853 A1* | 2/2007 | Boyd ............................ 119/721 |
| 2008/0272920 A1 | 11/2008 | Brown |

* cited by examiner

*Primary Examiner* — Trinh Nguyen
(74) *Attorney, Agent, or Firm* — Olive Law Group, PLLC

(57) ABSTRACT

Systems and methods for monitoring and controlling animal behavior are disclosed. According to an aspect, a system comprises a computing device comprising at least one processor and memory. The system includes a detection electrode and an animal signaling device. The computing device is configured to detect a change of an electrical capacitance at a detection electrode. The computing device is also configured to determine a position of an animal based on the change in the electrical charge. Further, the computing device is configured to control the animal signaling device to communicate a signal in response to determining the position of the animal.

17 Claims, 14 Drawing Sheets

FIG. 6
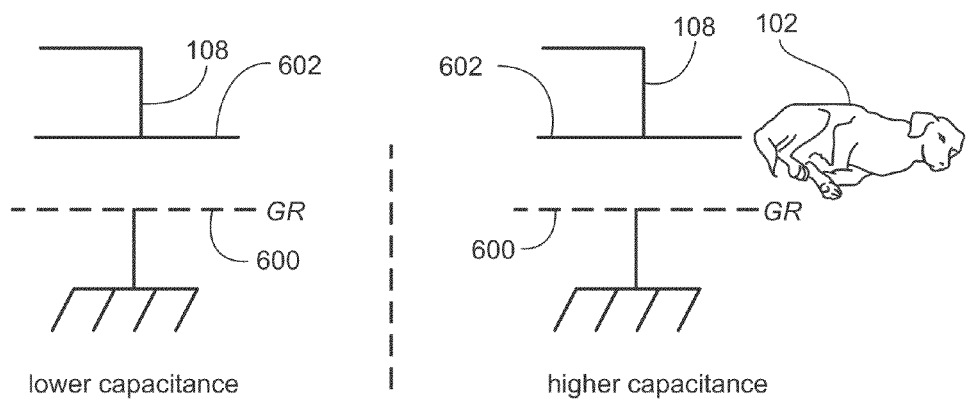
lower capacitance
higher capacitance
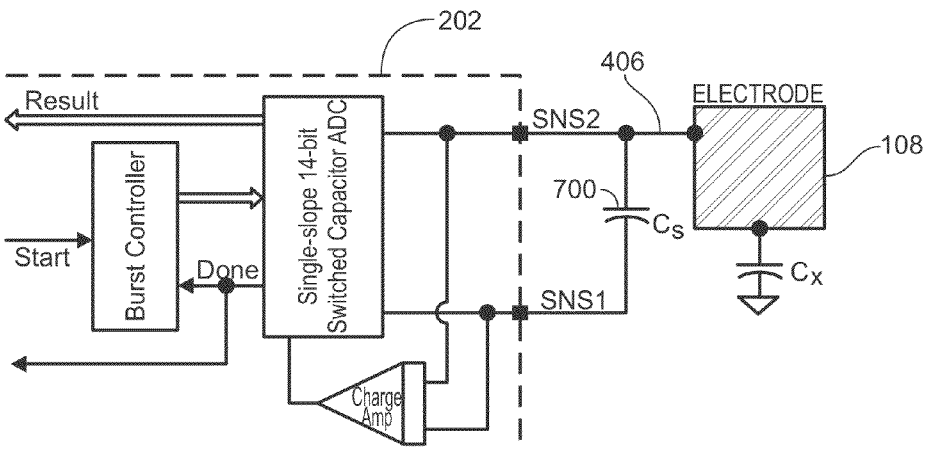
FIG. 7

FIG. 22
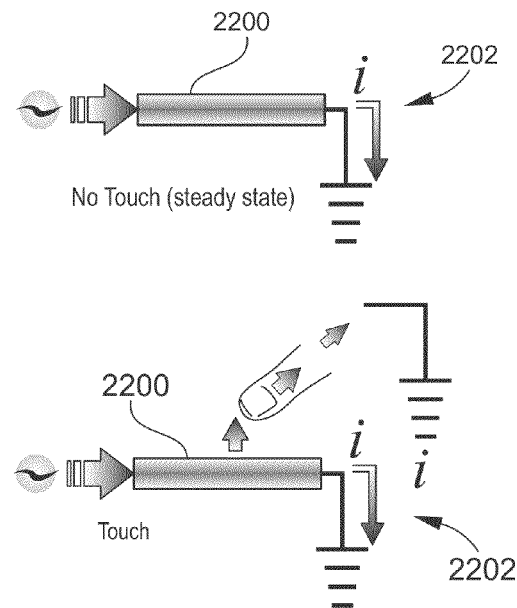
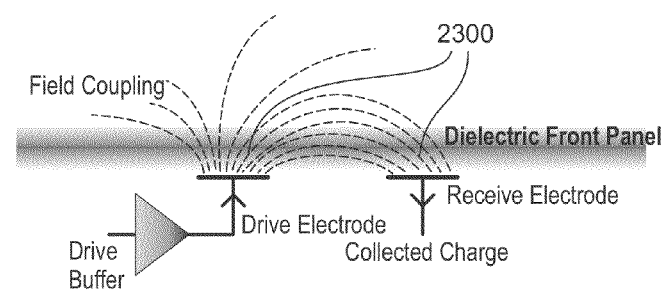
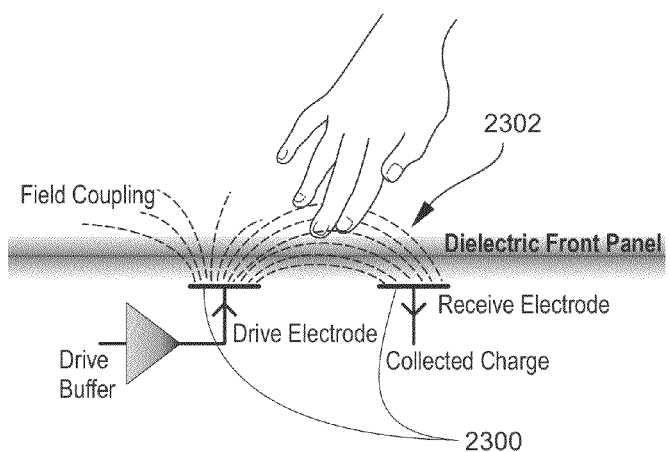
FIG. 23

SYSTEMS AND METHODS FOR MONITORING AND CONTROLLING ANIMAL BEHAVIOR

CROSS REFERENCE TO RELATED APPLICATION

This application claims the benefit of U.S. Provisional Patent Application No. 61/855,781, filed on May 22, 2013 and titled SYSTEM AND METHODS FOR MONITORING AND CONTROLLING PET BEHAVIOR, the content of which is hereby incorporated herein by reference in its entirety.

TECHNICAL FIELD

The field of the invention relates to electronically sensing the presence of an animal, and more specifically, to system and methods for monitoring and controlling animal behavior.

BACKGROUND

Monitoring and controlling the behavior of animals may need to occur in numerous situations. The numerous situations may involve or require the actuation of an annunciator, actuator or behavior conditioning stimuli based on monitoring the presence of various types and sizes of animals and/or by detection of various targeted animal behaviors. It may be necessary that such animal be given or denied access to a variety of objects or locations based on the presence, position or detection of particular types of animals and behaviors. One example of the type of behavior that may need to be monitored may involve letting the animal through a door into or out of a shelter. The animal may require the assistance of a person opening the door to allow entry or egress from a room blocked by such door. Another example may be the actuation of an annunciator indicating the animal is utilizing its water or feed bowl and/or actuating a dispenser, another example may be an annunciator indicating the need and means for servicing a litter box after use. An additional example may be the need to actuate an annunciator indicating the animals' presence at a location where access by the monitored animal should normally be denied, this may include the animal being located on a specific piece of furniture or restricted location within the home and actuating a deterrence such as light, sound or shock generator.

There have been attempts to signal animals when the animal wants to come inside or go outside their home, get food, use a litter box or activate an actuator for cleaning a litter box by the use of pet collars, RFID tags, photo electric means sensing the clawing action of animals. Examples may include the disclosure of U.S. Pat. No. 4,400,696 (hereinafter "Klingensmith"), an animal actuated attention attracting apparatus is disclosed wherein the apparatus is positioned at a level convenient for reach by the animal. This device is activated by a lever type switch which causes an electric circuit to ring a bell or flash a light. Klingensmith's device is complex and requires a hinged panel which is secured to the outside of the door or wall by threaded screws. In U.S. Pat. No. 5,303,677 (hereinafter "Jones"), an animal entrance pager is disclosed that can be fitted over the vertical edge of a door with a non-skid material. Jones utilizes metal springs together with other metal components such as studs and casing which is soldered to a channel means. In U.S. Pat. No. 2,634,409 (hereinafter "Walcher"), a conventional push bell is disclosed which can be activated by a push button or by a switch that is activated by releasing pressure on the switch component. In U.S. Pat. No. 4,574,735, a membrane switch is disclosed to detect an animal by weight. U.S. Pat. No. 5,048,465 utilizes a timing device to activate an actuator for a self-cleaning litter box.

These past technologies inadequately address the needs of specific animals and specific animal owners. These past inventions instead attempt to produce a single design product for all animals irrespective of size or character of the animal. The result is the device tends to misfire and/or the animal is unable to consistently strike, push, scratch or alternately use the existing devices. In particular, the existing devices are more effectively designed for larger dogs but do not function as effectively for cats and small or toy dogs. For example, prior attempts incorporating a switch that requires an animal to reach upward and swipe at or nudge the surface with a paw may not be useable by cats and small or toy dogs.

As a further example, a cat's nose is surrounded by extremely sensitive whiskers which it uses to "sense" or feel the world around it. Thus, most cats carefully avoid use of the nose and whiskers as anything other than sensory organs. Seldom, if ever, will a cat be observed using the nose or whiskers as a pushing tool. Cats and small dogs have no hesitation, however, to step forward to look at or smell something at or below head level without the use of a paw.

In view of the foregoing, there is a need for improved systems and techniques for controlling and monitoring animal behavior.

SUMMARY OF THE INVENTION

Disclosed herein are systems and methods for monitoring and controlling animal behavior. According to an aspect, a system comprises a computing device comprising at least one processor and memory. The system includes a detection electrode and an animal signaling device. The computing device is configured to detect a change of an electrical capacitance at a detection electrode. The computing device is also configured to determine a position of an animal based on the change in the electrical charge. Further, the computing device is configured to control the animal signaling device to communicate a signal in response to determining the position of the animal. In an example, the present invention features an ultra-low power electronic device and method which monitors the environment adjacent to, on or within an object, and which may be used as an animal detection or animal behavior modifying system without the need for mechanical linkages or excessive power.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 6 is an illustration showing an example of a detection electrode usable with an animal monitoring system according to embodiments of the present invention;

FIG. 7 is a block diagram showing an example of a charge transfer controller comprised in the computing device for detecting the position of an animal according to embodiments of the present invention;

FIG. 22 is a schematic diagram showing an example of an embodiment of projected capacitance sensed via self-capacitance according to embodiments of the present invention; and FIG. 23 is a schematic diagram showing an example of an embodiment of projected capacitance sensed via mutual capacitance according to embodiments of the present invention.

DETAILED DESCRIPTION OF THE PREFERRED EMBODIMENTS

Figure 1:
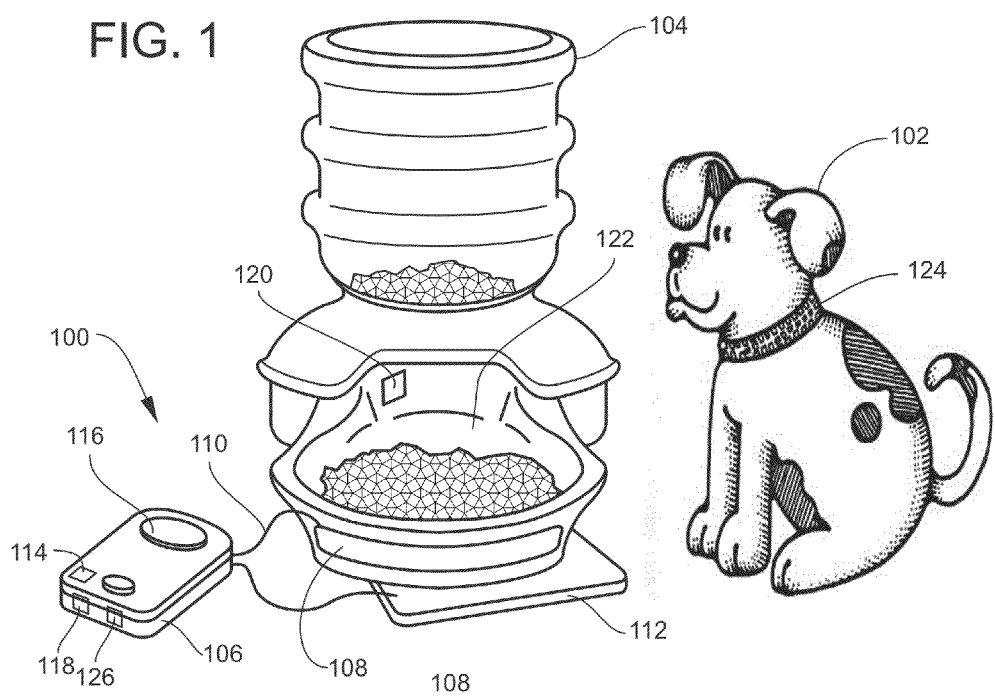
FIG. 1 is a perspective view showing an example system for monitoring and controlling animal behavior, an animal, and an animal feeder according to embodiments of the present invention.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, a processing circuit for the detection of a change in voltage level or change in measured capacitance across a circuit. In another example, a computing device may be a server or other computer located within a commercial, residential or outdoor environment and communicatively connected to other computing devices (e.g., annunciators, transducers, animal shocking devices or computers) for monitoring, controlling and/or managing animal behavior. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The presently disclosed invention is now described in more detail. FIG. 1 is a perspective view showing an example system 100 for monitoring and controlling animal behavior according to embodiments of the present invention. An animal 102, and an animal feeder assembly 104 are also shown. The system 100 comprises a computing device 106 which is shown electrically coupled to a detection electrode 108 by an electrical interconnect interface 110 for the detection of a change in a capacitance or voltage level in response to the positioning of the animal 102. As described above the computing device 106 may comprise hardware, software, firmware, or combinations thereof for implementing the functionality described herein. For example, the computing device 106 may include one or more processors and memory. The computing device 106 may also be coupled to a shield 112. The shield 112, as will be described in greater detail in the example of FIG. 4, may be powered (e.g., electrically driven) or unpowered as appropriate for protecting the detection electrode 108 from sensing changes in the environment creating an erroneous detection by the computing device 106. In this example, the computing device 106 is configured to detect the position of the animal 102 relative to the animal feeder assembly 104 based on a change of the capacitance sensed at the detection electrode 108. Based on the change of the capacitance sensed at the detection electrode 108 the computing device 106 may determine a position of the animal 102. The computing device 106 may be further configured to control the animal signaling device 114 to communicate a signal in response to determining the position of the animal 102 to be within a predetermined area or within a predetermined distance from the detection electrode 108. The animal signaling device 114 may also be configured to transmit the signal to an annunciator 116, the generation of scent 118, and/or the controlling of an electro-mechanical mechanism, such as, a switch 120 or door 122 for providing food, as an example. It will be appreciated that the feeding device may contain more than one detection electrode 108 and the computing device 106 may be configured to detect either the pet's proximity and/or contact with the detection electrode 106.

With continued reference to FIG. 1, the computing device 106 may be configured to sense an approximate position of the animal 102, whether the animal 102 is in close proximity to or in contact with a specific object or location. The term "close proximity" may be defined as being 25 centimeters or less to a sensor such as a detection electrode 108 or an assembly (not shown) electrically associated with a detection electrode 108. When a conductive object, such as the animal 102, comes into close proximity to, or in contact with, a detection electrode 108 associated with the computing device 106, the local electrostatic field surrounding the detection electrode 108 is distorted. This is measurable as a change in the capacitance or voltage at the detection electrode 108. One or more embodiments of the exemplary system and method may further include reminding the animal 102, an owner or user of the system 100 of the proximity to or the contact with the object associated with the detection electrode 108 by signaling either the animal 102 and/or an owner/user.

With continued reference to FIG. 1, the detection electrode 108 may be positioned as a pad containing at least one electrically conductive electrode, surface or coating in electrical communication with a computing device 106 placed in direct contact or close proximity to the object being monitored. The monitored objects associated with the system 100 are not ordinarily of interest unless actually touched or determined to be in close proximity of the animal, the capacitance of the detection electrode 108 associated is measured to obtain the operative capacitance or voltage level and compared with the reference capacitance or voltage level stored in the memory of the processor whereby any variations between the measured capacitance or voltage and the reference capacitance or voltage are indicative of an animal's position or proximity. The use of a touch sensor (not shown) as a proximity or contact sensor may help insure the pet is detected. The predetermined distance for the proximity indication may be defined by a range of acceptable values, wherein the animal signaling device 114 communicates a signal if the charge value is only above this range, only below this range, or either above or below the range. As another example, the computing device 106 may be operatively coupled an imaging device (not shown) as a means of monitoring specific objects and locations. As noted above, the detection electrode 108 may be collocated with the computing device 106 or with the shield 112. The computing device 106 may include one or more detection electrodes 108.

With continued reference to FIG. 1, the animal 102 may be alternatively detected based on the animal 102 wearing a transmitting collar device 124 or other transmitting device. Accordingly, the transmitting collar device 124 may comprise an RFID tag, as an example. The transmitting collar device 124 may be detected and monitored if the animal 102 wearing the transmitting collar device 124 comes within close proximity to or in contact with an electrode associated with the monitored object. Additionally, the system 100 may provide for a data recording system 126, including but not limited to volatile and/or non-volatile memory such as flash memory, an SD card or other appropriate storage medium. The system 100 may also be configured to transmit animal proximity and/or behavior via Wi-Fi, 3G, 4G or other radio or IR means (not shown) thus enabling data collection for recording and compiling proximity and/or behavior information for the animal that comes in close proximity to or in contact with the monitored object. Alternatively, the monitoring of proximity may be accomplished by means other than contact with the feeding device as described above, as an example. For example, the detection electrode 108 associated with the computing device may be placed in front of or under the monitored object, such as, the animal feeder assembly 104 or other monitored object without actual incorporation into the object or device itself. Alternatively, the detection electrode 108 may be collocated in the computing device 106. In another example, detecting a capacitance at a reference capacitor reaching a predetermined value indicating a presence of the animal 102 may be configured such that the computing device 106 does not utilize mechanically actuated parts.

Figure 2:
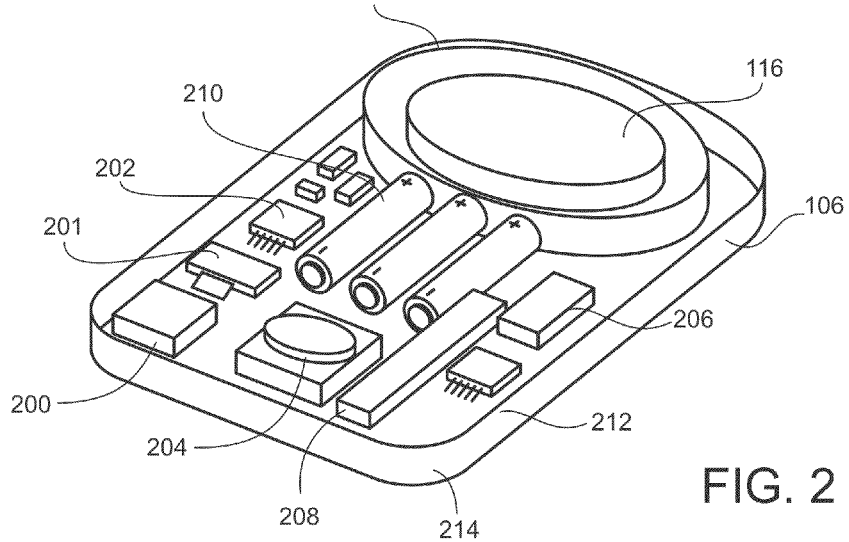
FIG. 2 is a perspective view showing another example of a system for monitoring and controlling animal behavior, including a computing device comprising the electronic components for detecting the position of the animal and signaling based on the position of the animal according to embodiments of the present invention.

In this regard FIG. 2, is a perspective view showing an example of the system 100 for monitoring and controlling animal behavior, including the computing device 106 comprising the electronic components for detecting the position of the animal 102, wherein the detection electrode 108 is collocated in the computing device 106 according to embodiments of the present invention. The computing device 106 includes, but is not limited to, the processor 200, the memory 201, a charge transfer controller 202, sensitivity control 204, RF encode/transceiver 206, an antenna 208, a power source 210, an annunciator 116, optionally integrated detection electrode 108 and case 212. The shield 112 may also be comprised within the computing device 106 as an electrically conductive coating 214 on the case 212. The charge transfer controller 202 may be electrically coupled to the detection electrode 108 for measuring the capacitance or voltage level at the detection electrode 108. The processor 200 may be operatively coupled and configured to communicate with one or more charge transfer controllers 202 such that the processor 200 may determine the proximity of the animal 102. The processor 200 may also be configured to store measurements in a database or as a data log in memory 201. The processor 200 may be coupled to the sensitivity control 204 for manual or programmatic control of the proximity threshold setting for determining the position of the animal 102. The RF encoder/transceiver 206 when coupled to the antenna 208 may be configured for transmission of readings and/or proximity events such that the computing device 106 may signal a remote device (not shown) of a proximity event. The annunciator 116 may communicate a signal to the animal 102 and/or owner using an audible or ultrasonic signal. Additionally, the annunciator 116 may be configured to provide a visual communication on the computing device 106 or case 212 and/or a display assembly in order to provide information relating to the animal's activity in proximity to or in contact with the detection electrode 108. Alternatively, a personal communication device such as the PDA, a cell phone or a tablet (e.g., iPad) type device may be considered as the annunciator 116 according to the embodiments of this invention.

Figure 3:
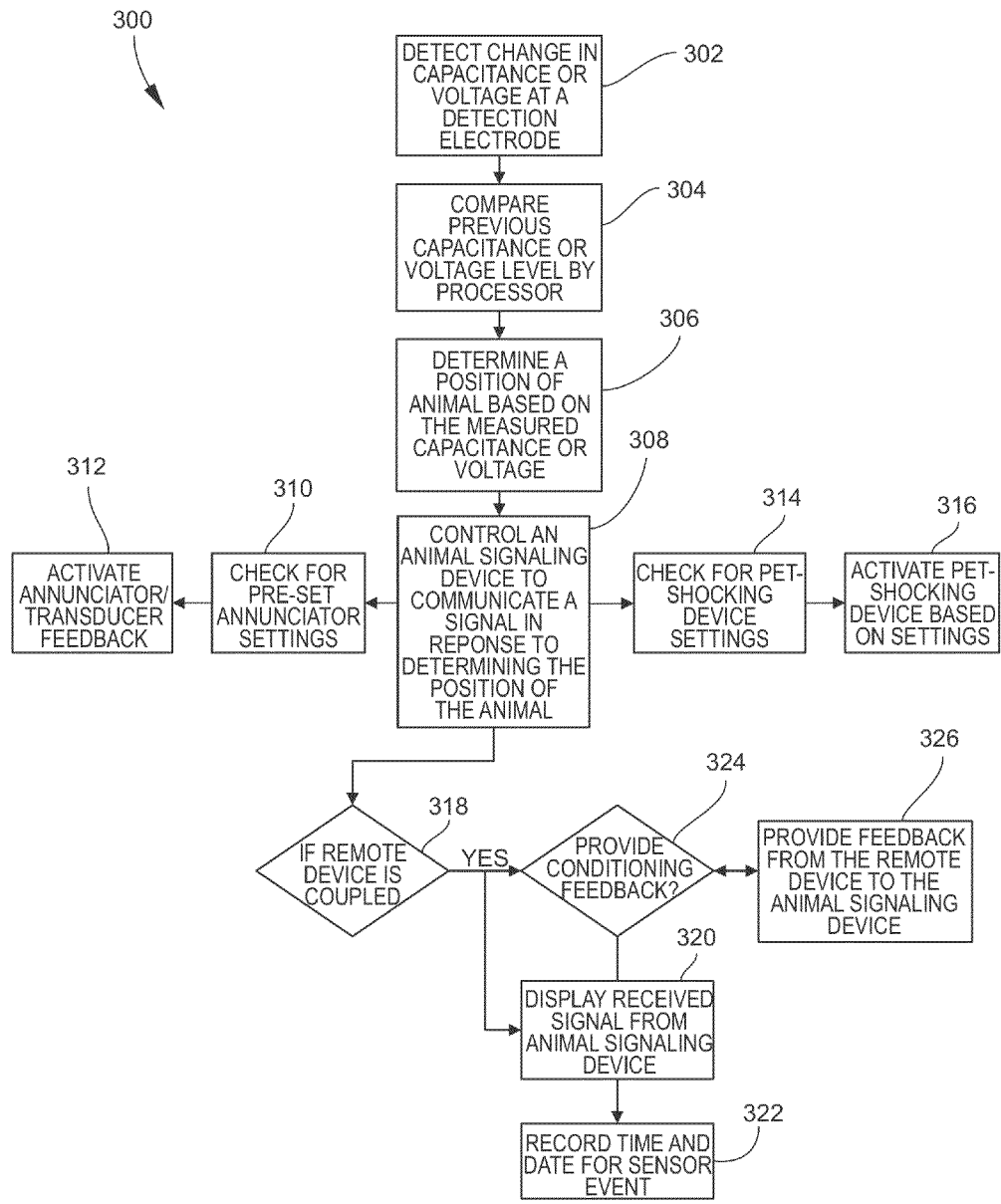
FIG. 3 is a flowchart showing an example method for monitoring and controlling animal behavior by associating the computing device, an animal signaling device, data transfer and a display according to embodiments of the present invention.

With regard to FIG. 3, a flowchart showing an example method 300 for monitoring and controlling animal behavior by associating the computing device 106, an animal signaling device 114, data transfer and a display is provided according to embodiments of the present invention. It is noted that reference is made to FIG. 1 as implementing the examples described for FIG. 3, although it should be understood that any suitably configured system can implement the method of FIG. 3.

Referring to FIG. 3, the method includes detecting 302 change in capacitance or voltage at a detection electrode. For example, the system 100 shown in FIG. 1 may detect a change in capacitance or voltage at a detection electrode 108 using the computing device 106. Further, the method of FIG. 3 includes comparing 304 the detected change in capacitance or voltage level. For example, the computing device 106 shown in FIG. 1 can compare the detected change in capacitance or voltage to a previous capacitance or voltage level that was detected. Alternatively, for example, the computing device 106 may compare the detected change in the capacitance or voltage to a stored threshold setting previously set manually or programmatically.

The method of FIG. 3 includes determining 306 a position of an animal based on the measured capacitance or voltage. Continuing the aforementioned example, the computing device 106 may determine a position of the animal 102 based on the measured capacitance or voltage. Further, the method includes controlling 308 an animal signaling device to communicate a signal in response to determining the position of the animal. For example, the computing device 106 may control an animal signaling device 114 to communicate a signal in response to determining the position of the animal 102. The signal communicated by the animal signaling device 114 may be encoded.

The method of FIG. 3 includes checking 310 for pre-set annunciator settings. Continuing the aforementioned example, the computing device 106 may check for pre-set annunciator settings. The pre-set annunciator settings may include pre-recorded messages of the owner or standard manufacturer messages providing feedback to or commands for the animal 102. The pre-set annunciator settings providing feedback may also be audible or ultra-sonic sounds. Further, the method includes activating 312 annunciator/transducer feedback.

With continued reference to FIG. 3, the method includes checking 314 for pet-shocking device settings. For example, the computing device 106 may control the animal signaling device 114 to check for pet-shocking device settings. The method includes activating 316 the pet-shocking device based on th settings. For example, the animal signaling device 114 may subsequently be configured to activate the pet-shocking device based on the settings. The activation of the pet-shocking device may be configured to provide both an audible or ultra-sonic sound in combination with the pet-shocking feedback.

The method of FIG. 3 includes determining 318 if a remote device is coupled. Continuing the aforementioned example, the computing device 106 may determine if a remote device is coupled. The method includes displaying 320 a received signal from the animal signaling device if a remote device is coupled. For example, if a remote device is coupled, either in a wireless or wired fashion, the animal signaling device 114 may provide a signal for display on the remote device. The method includes recording 322 time and date for the sensor event. For example, either the computing device 106 or the remote device may then record the time and date for the sensor event. In block 324 of FIG. 3, if the remote device is configured to provide conditioning feedback, then in block 326, the device may be configured to execute an application to provide the feedback from the remote device to the animal signaling device 114. At the user's discretion, the user may elect to provide conditioning feedback via annunciators or actuators, for example, dispensing a treat, audible admonishment, visual or electrical stimulation to the animal 102 via a command or instruction sent from the remote device.

Figure 4:
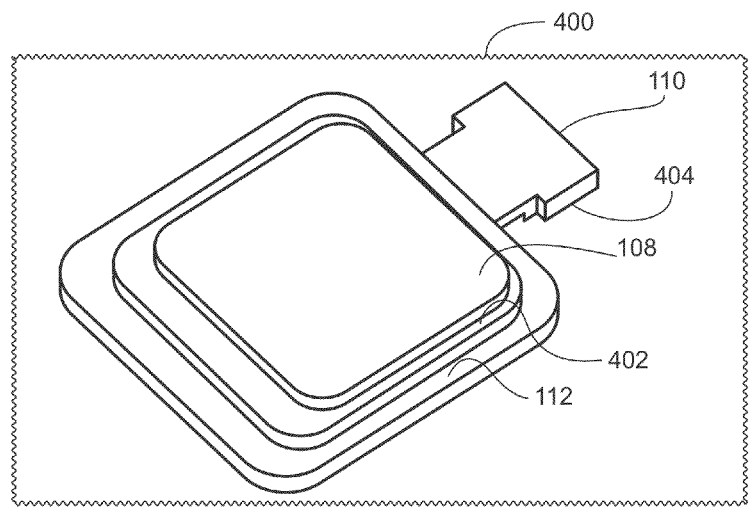
FIG. 4 is a perspective view showing an example of an electrode assembly with a shield that is electrically associated with a computing device according to embodiments of the present invention.

FIG. 4 illustrates a perspective view showing an example of an electrode assembly 400 with the shield 112 that is electrically associated with a computing device 106 is provided according to embodiments of the present invention. Referring to FIG. 4, the shield 112 may be a passively or actively driven device, wherein the shield 112 may be powered or driven so as to provide increased shielding from spurious environmentally based interference. The electrode assembly 400 may be comprised of the detection electrode 108, an electrical insulator 402, a connector 404 and an electrical interconnect interface 110. The shield 112 is positioned adjacent to, but is electrically isolated from the detection electrode 108. Electrically isolating the detection electrode 108 from the shield 112 shields the detection electrode 108 from any spurious charge transfer potential within the surrounding environment. An example of spurious influence may be seen by the placement of the electrode assembly 400 on flooring, furniture or a door surface. An erroneous capacitance or voltage change detection may result from a charge transfer from a direction not intended (e.g., from the other side of a door or underneath the detection electrode 108 or alternate grounding source).

With continued reference to FIG. 4, the active or driven shield 112 can provide additional protection from erroneous sensor events. With the shield 112 electrically isolated but physically situated near detection electrode 108 at the same frequency, pulse width and voltage as the input to the electrode assembly 400. Similar in function to the principal of driving RF energy in coax cable shielding so as to avoid signal loss. This principal would serve to minimize a change in charge on electrically associated components of electrode assembly 400. Since both nearby conductive surfaces and the electrode assembly 400 can be placed in phase at the same electrical potential and charged and measured at the same frequency, no differential charge may exist between the two, thereby avoiding a charge transfer resulting in an erroneous detection of the animal 102. Alternately, the use of a multichannel sensor instead of a single channel sensor and the use of a Boolean condition that must be true amongst two or more channels can provide the logic to the processor 200 further providing protection against an erroneous indication of the animal 102 in proximity.

Figure 5:
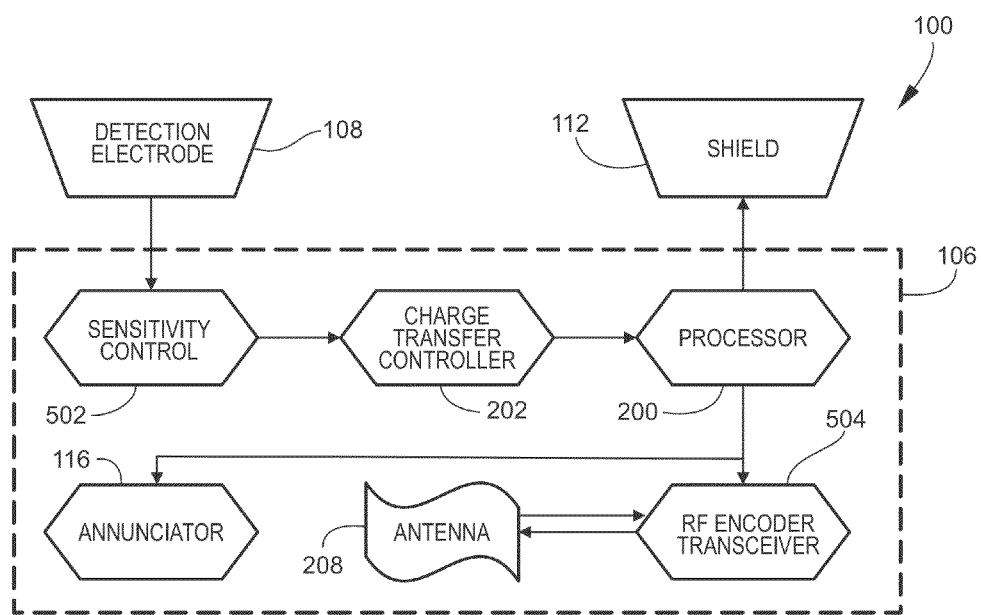
FIG. 5 is a block diagram showing an example of the system comprising a computing device including a detection electrode and shield usable with an animal monitoring system according to embodiments of the present invention.

With regard to FIG. 5, a block diagram showing an example of the system 100 comprising a computing device 106 including a detection electrode 108 and shield 112 usable with an animal monitoring system is provided according to embodiments of the present invention. The detection electrode 108 may be electrically associated with a charge transfer controller 202 via sensitivity control 502. Operation of the computing device 106 is controlled by the processor 200. The processor 200 concurrently generates a charge on the shield 112 via connector 404 and the electrical interconnect interface 110. The change of the detected capacitance or voltage value at the detection electrode 108 as compared to either a pre-set value or a previously measured value is caused by the grounding influence created by the presence of a the animal 102. The change of the detected capacitance or voltage value is by the charge transfer controller 500. In this manner the processor 200 may be configured to activate an RF encoder transceiver 504 resulting in the generation and transmission of a signal via antenna 208 and may concurrently cause the activation and generation of a signal by annunciator 116.

With regard to FIG. 6, the proximity detection functions such that there exists a capacitance between any electrical surface reference point relative to ground, as long as electrical isolation exists between the reference point and ground. The detection electrode 108 may be the reference point and an electrically conductive area as shown in FIG. 1. A ground node 600 may be formed by the surrounding area. When the animal 102 is brought into close proximity (25 centimeters or less in this exemplary embodiment) of the detection electrode 108 an increased coupling between the reference point and ground occurs. As a result, the capacitance of the detection electrode 108 and the electrically associated surface area, relative to ground 600 can increase. This capacitance is compared with a reference capacitor whose capacitance or charge may be altered so as to allow adjustment of the systems detection sensitivity threshold. When the detection electrode 108 is physically positioned near the animal 102, the presence of the animal 102 may increase the capacitance between the detection electrode 108 and ground 600 as the animal 102 approaches the object associated with the detection electrode 108. The detection electrode 108 may be further coupled to a sensing plate 602. By coupling the detection electrode 108 to the sensing plate 602. The detection electrode may be used in a larger number of applications. For example, the sensing plate 602 may be used mounted on a wall or in a mat placed on the monitored object as will be discussed below.

With regard to FIG. 7, a block diagram showing an example of a charge transfer controller 202 comprised in the computing device 106 for detecting the position of the animal 102 is provided according to embodiments of the present invention. Touching or close proximity to the detection electrode 108 can increase the capacitance significantly. To measure a change in the capacitance, the charge transfer controller 202 is provided. The charge transfer controller 202 employs a charge transfer method of capacitive sensing. A charge is initially transferred to all of the electrically contiguous parts of the detection electrode 108 via electrical interconnect interface 110, thereby allowing it to function as capacitor (CX) while a charge is transferred into charge collection reference capacitor (CS) 700 until the voltage on capacitor CS reaches a tripping point. As described in FIG. 1, a detection electrode 108 comprising an electrically conductive external contact associated with the exterior of a monitored object. An alternate configuration provides for a directionally active shield 112, wherein the shield 112 is not configured as an integral part of the monitored object but instead situated in close proximity to such monitored object. The electrical interconnect interface 212 is provided to electrically associate the shield 112 and any associated detection electrode 108 coupled with charge transfer controller 424. The electrical interconnect interface 212 and detection electrodes 108 associated with the charge transfer controller 202 may be incorporated into the computing device 106.

Figure 8:
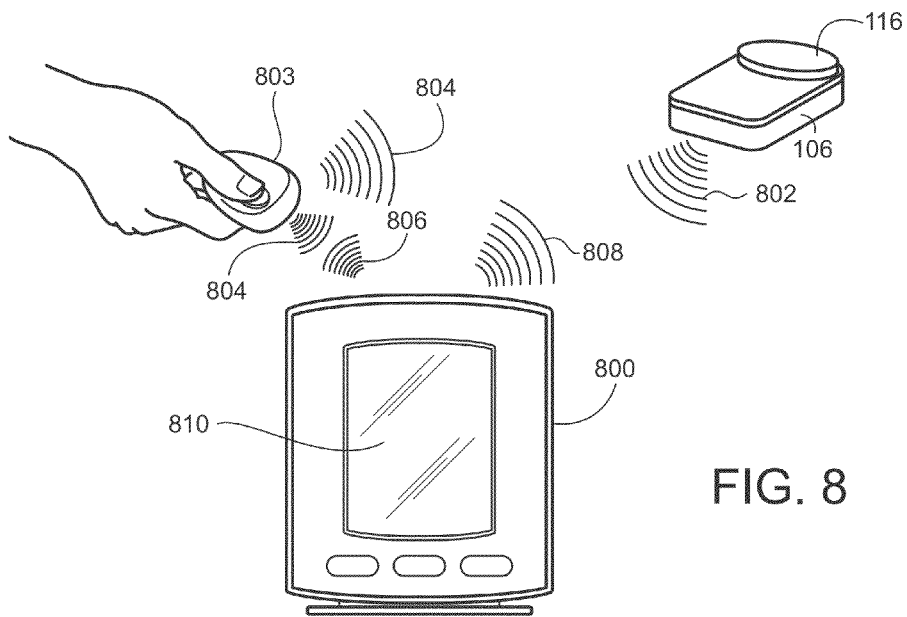
FIG. 8 is a diagrammatic illustration showing a wireless communication process used in the computing device and the display for monitoring and controlling an animal according to embodiments of the present invention.

With regard to FIG. 8, a diagrammatic illustration showing a wireless communication process used in the computing device 106 and a display device 800 for monitoring and controlling an animal 102 is provided according to embodiments of the present invention. Upon detection of a change in the capacitance or voltage at the associated detection electrode 108, the computing device 106, in communication with display device 800, may initiate the communication of an event signal 802 for the display of a message on the display device 800. Alternatively, a remote control key fob transceiver 803, may initiate the generation of an alternative event signal 804 which may be communicated to either the computing device 106 or the display device 800. The alternative event signal 804 may be used to acknowledge a proximity event triggered by the animal 102 or initiate a manual or programmed feedback event to the animal 102 or turn off a feedback event such as a sound or shock. The remote control key fob transceiver 803 may also receive a signal 806 from the display device 800 or the event signal 802 from the computing device 106. The display device 800 may also be configured to transmit a display signal 808 to the computing device 106 based on either manual interaction, such as a button press on the display, or a programmatic response based on a timed event, etc. Alternatively, the display signal 808 may be activated by a user using a user interface 810 on the display device 800.

Figure 9:
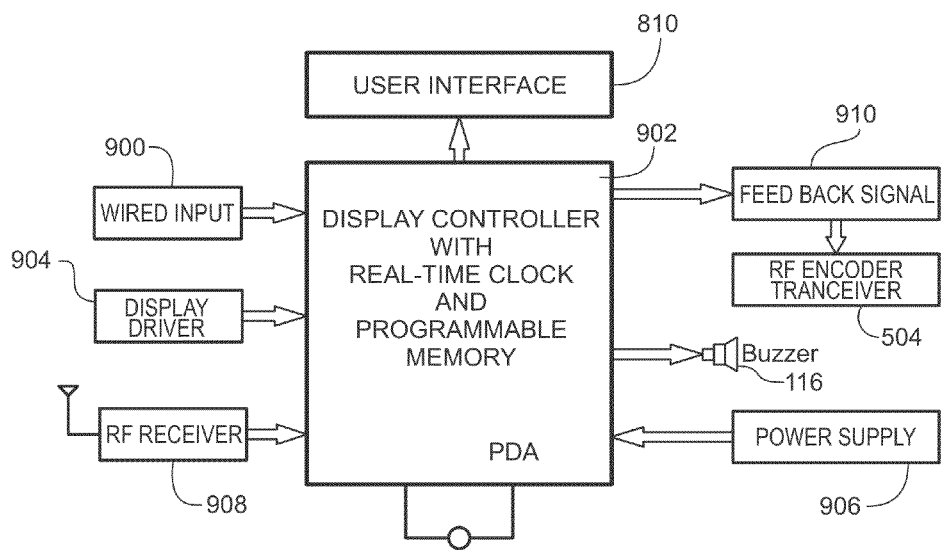
FIG. 9 is a block diagram view showing the display and a PDA operatively associated with the computing device and for monitoring and controlling animal behavior according to embodiments of the present invention.

With regard to FIG. 9, a block diagram view showing the display device 800 operatively associated with the computing device 106 and for monitoring and controlling animal behavior is provided according to embodiments of the present invention. The display device 800, as described above may be a PDA, iPad, pager, smartphone, etc. FIG. 9 describes at a functional level the display device 800. The display device 800 comprises a wired input port 900 for receiving a wired connection with the system 100. The display device 800 also comprises a display controller 902 and a display driver 904 for driving a user interface 810. The display device 800 may also comprise the annunciator 116 and a power supply 906 for battery or AC sourced power. For transmitting and receiving signals from the remote control key fob transceiver 803 or the animal signaling device 112, the display device 800 may comprise an RF receiver 908. The display device 800 may also comprise an RF encoder transceiver 504 for transmitting a feedback instructions or command to the computing device 106.

With continued regard for FIG. 9, the signals generated by the display device 800 may function as an annunciator 116 and computing device 106 and provide a means for signaling a proximity event. The display device 800 may also provide a means for the user to control one or more conditioning feedback mechanisms which include as non-limiting examples, food dispensing, door opening, litter box emptying, electric shock, via a transducer, annunciator or actuator. It should be appreciated that some redundancy is built into the elements of the system 100 described herein. The redundancy may be preferred but is not considered essential. All detection electrodes 108 employed in the system 100 may be sensor assemblies including integrated circuits providing noise filtration and/or sensitivity adjustments. It should be noted, no ZIG-BEE® type mesh radio network is required for precisely locating the monitored object or animal 102. The display device 800 may be configured for wireless networking via a radio signal with a communication protocol such as, but not limited to GMRS, CDMA, GSM, Bluetooth/Wi-Fi/LAN or alternately encoded IR signals.

Figure 10:
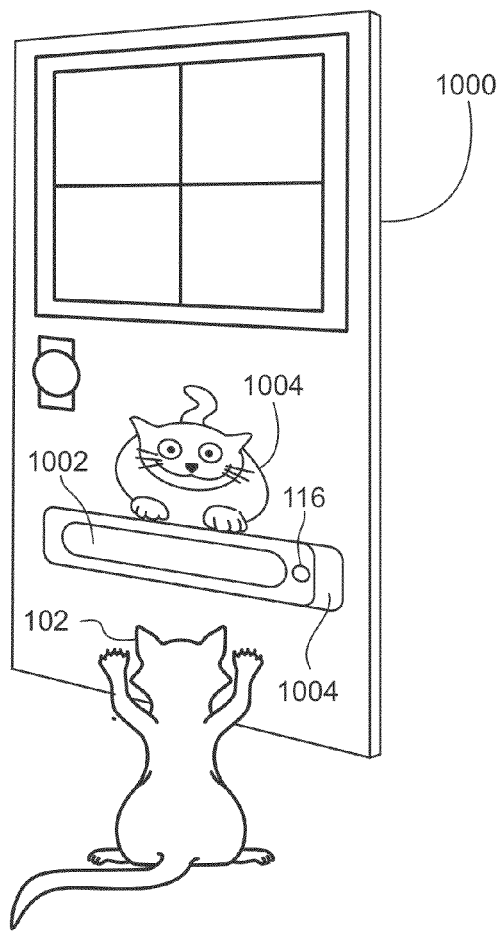
FIG. 10 is a perspective view showing an example of the system being utilized as a pet doorbell according to embodiments of the present invention.

With regard to FIG. 10 is a perspective view showing an example of the system 100 being utilized as a pet doorbell is provided according to embodiments of the present invention. The detection electrode 108 may be located on the inside or outside of the door 1000 depending on whether ingress or egress of the pet is to be determined. One exemplary embodiment shows the detection electrode 108 and computing device 106 configured as an electrically conductive horizontal bar 1002 located on the outside of the monitored door 1000. Another exemplary configuration for the detection electrode 108 is a pet caricature 1004 incorporating a least one electrically conductive surface. The geometric shape of the detection electrode 108 is typically a non-critical factor as to determining system sensitivity for detecting a change in the capacitance or voltage. The collective sensitivity of the detection electrode 106 relating to its ability to detect the presence of the animal 102 via change in capacitance or voltage is primarily determined by alternate electrical paths to ground surrounding the detection electrode 108 and the size and proximity of the detection electrode's 108 electrically conductive planar surface in relation to the parallel charge carrying cross sectional area of the presenting pet. The shield 116 may be comprised within a shield assembly 1004. In this manner, the shield assembly 1004 enables the shield 112 such that the shield 112 is protected from environmental elements, rough use and/or enabled to be mounted in various positions.

Figure 11:
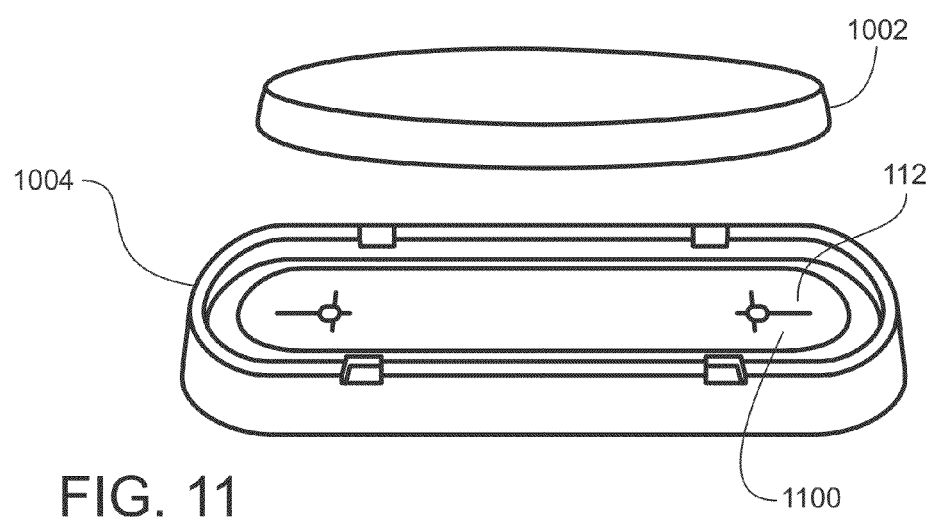
FIG. 11 is a perspective view showing an example of a shield configured to be coupled to the computing device to limit undesired interference according to embodiments of the present invention.

FIG. 11 is a perspective view showing an example of the shield 112 configured to be coupled to the computing device 106 to limit undesired interference is provided according to embodiments of the present invention. As an example, the function of the shield 112 is to impart directionality to the detection capabilities of the system 100. The shield 112 as shown assures that the provided detection electrode 108 may only be reactive to the transfer of charge to/from the pet when pet is situated in front of the detection electrode 108. This application of the shield 112 may be configured as an active shield which effectively provides for the detection electrode 108 and shield 112 for differentiating whether the animal 102 is situated on the inside or outside of the door 1000. As with every example of the shield 112 disclosed herein, the shield 112 may also be an active or driven shield 1100, such that greater protection from spurious environmental elements is obtained.

Figure 12:
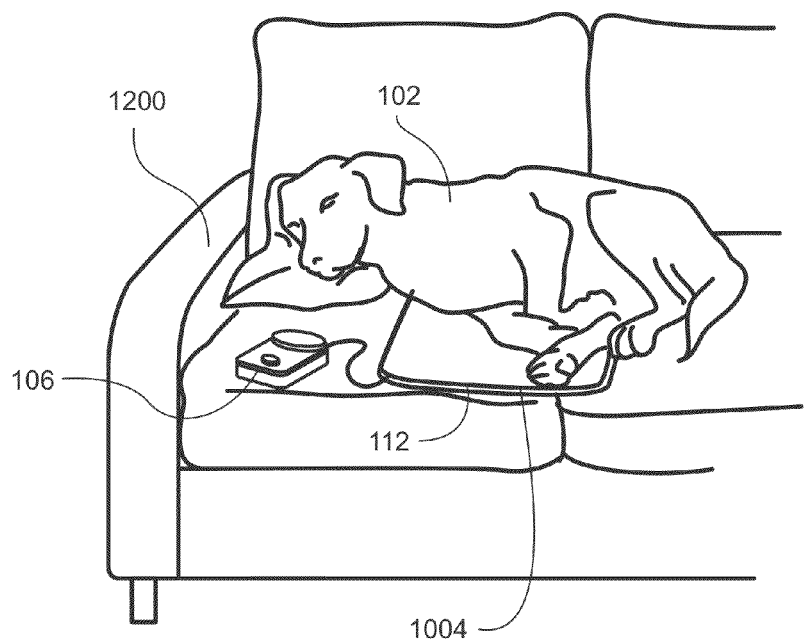
FIG. 12 is a perspective view showing an example of the system configured to detect pets on furniture according to embodiments of the present invention.

With regard to FIG. 12, a perspective view showing an example of the system 100 configured to detect animals on furniture 1200 is provided according to embodiments of the present invention. The computing device 106 coupled to the detection electrode 108 and shield 112 may be configured to detect the proximity of the animal 102. The detection electrode 108 is cooperatively positioned on the furniture 1200 in such a manner as to monitor and detect the presence of the animal 102 when situated on or near the furniture or household item. Depending on the composition and construction of the household item an assembly with the driven shield 112 and an integrated detection electrode 108 may be alternatively collocated in the same assembly unit to assure consistent and reproducible animal monitoring results free from spurious ground paths.

Figure 13:
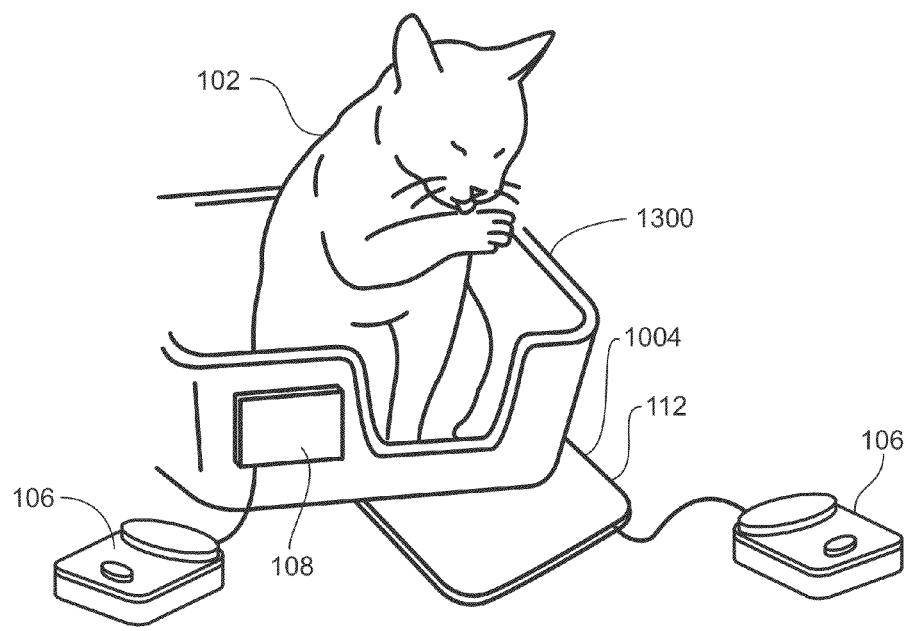
FIG. 13 is a perspective view showing an example of the system configured to detect usage of a litter box by a pet according to embodiments of the present invention.

FIG. 13 is a perspective view showing an example of the system 100 configured to detect usage of a litter box 1300 by the animal 102 is provided according to embodiments of the present invention. The placement of a driven shield 112 placed on the floor with the litter box 1300 placed directly above may be an example configuration. In this example, the driven shield 112 precludes a charge transfer to the floor thereby maintaining the sensitivity and selectivity of the detection electrode 108 to detect the close proximity of the animal 102 or entry into a monitored litter box 1300. The annunciator 116 and/or actuators described above may be used to provide conditioning feedback to the animal 102 and control electrical and mechanical functions (e.g., dirty litter box warning light or self-cleaning mechanism of the litter box 1300), either autonomously or by direct interaction with the pet owner, via remote control 803 or display device 800. Alternately, a configuration for the placement of a detection electrode 108 directly on one or more of the litter box 1300 surfaces allows the detection of the animal 102 in close proximity with the litter box 1300. It should be understood that the use of one or more driven shield sensor 112 with directional selectivity placed on a surface of the litter box 1300 would provide detection information discriminating between whether the pet was in the litter box 1300 or outside the litter box 1300 and which action occurred first. Boolean logic associated with the processor 200 would allow such information to be useful in directing and controlling the appropriate functioning of a litter box 1300 cleaning actuator mechanism.

Figure 14:
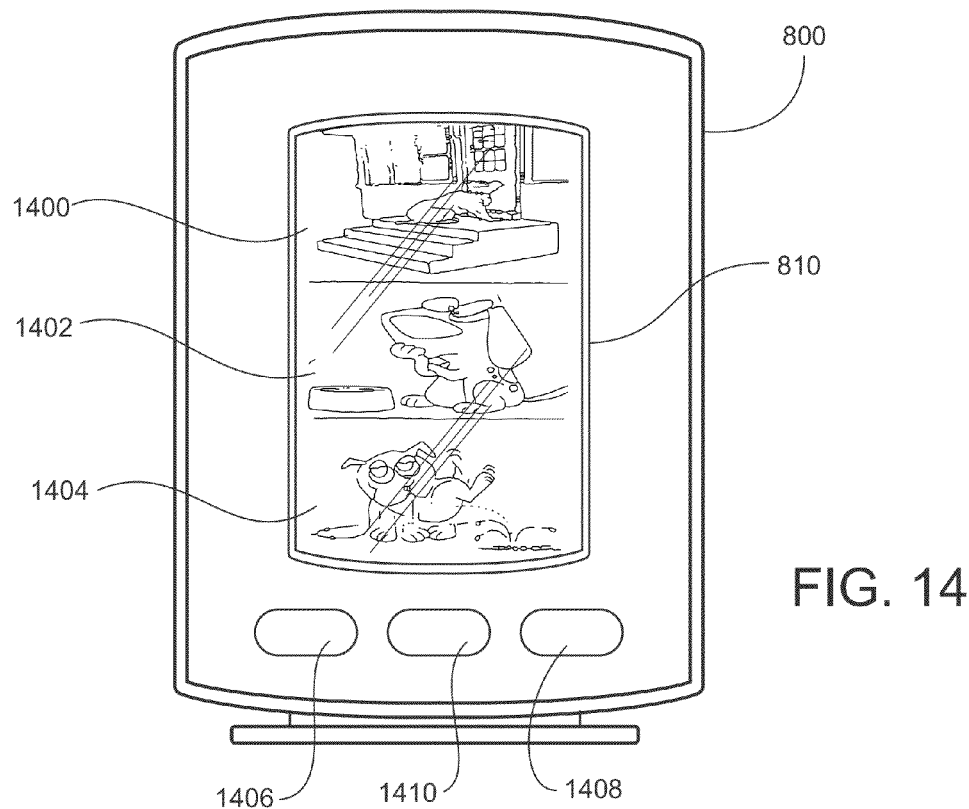
FIG. 14 is a perspective view showing an example of the system configured to display graphic information relating to which pet activity has been detected according to embodiments of the present invention.

With regard to FIG. 14 is a perspective view of the display and control assembly 500 that illustrates how the computing device 106 may further include the ability to communicate wired or wirelessly with a display device 800 capable of presenting audio and/or graphic messages, as well as, documenting time and date of occurrences of animal associated activities. The display controller 902, when in communication with the computing device 106 provides a means of controlling and graphically displaying the status of any of a plurality of computing devices 106 associated with system 100. As non-limiting examples, the graphic illustrations show the animal 102 activating the pet doorbell while outside the house as described previously in FIG. 10. Additionally, a graphic illustration 1400, 1402, and 1404 may represent the animal 102 at the door 1000, at a feeding assembly and other targeted behaviors desired to be controlled or monitored. Alternately, a food status indicator, perhaps shown as a fuel level indicator may be included in the graphic representation (not shown). In addition, illustrations reflecting the presence of the pet at the detection electrode 108 and the sensor 112 located on the interior of a domicile entrance door 1000 may indicate the pet's desire to exit the location may be shown. User program selector switch 1406 may be provided to select from pre-programmed routines held in memory of display device 800. Also shown, feedback switch 1406 is provided for activating a feedback annunciator 116 for conditioning the animal 102. The display device may also be configured with an actuator switch 1408 which may be provided for causing the actuation of a system associated actuator relating to a possible pet associated electro-mechanical mechanism. It should be understood the utilization of illustrations and graphic images to indicate sensor status does not limit the option of utilizing audible, visual, text or other signal methods. The display device 800 may also be configured with a display control button 1410 for controlling a plurality of proximity events received.

Figure 15:
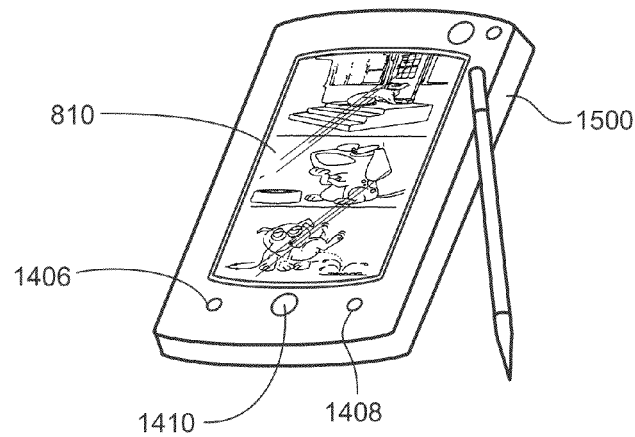
FIG. 15 is a perspective view showing an example of a PDA display assembly operatively associated with the system to be used to monitor and control animal activities according to embodiments of the present invention.

FIG. 15 illustrates a perspective view showing an example of a PDA 1500 used as the display device 800 operatively associated with the system 100 to be used to monitor and control animal activities is provided according to embodiments of the present invention. Alternatively, means of communicating with the system 100 sensors and/or display device 800 or computing device 106 may be accomplished via a PDA. Thus, as used below, the term 'PDA' may be defined as a device or combination of devices operable as a telephone and having additional customizable computing functions, the device or combination respectively being portable.

Figure 16:
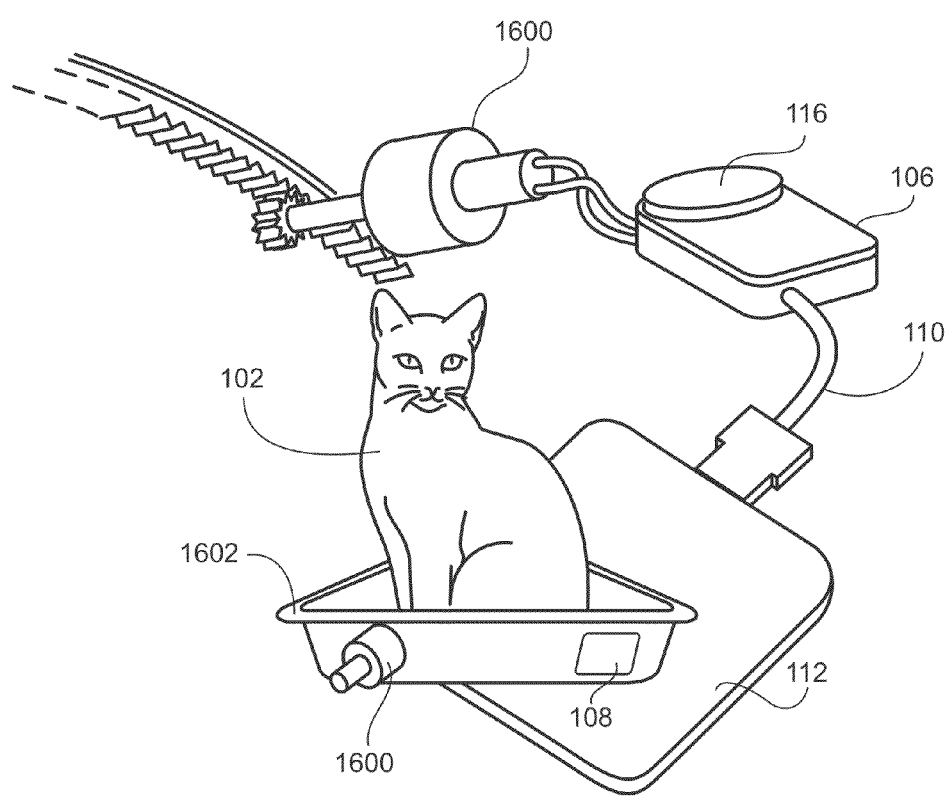
FIG. 16 is a perspective view showing an example of the system configured to control the activation of an electromechanical actuator associated with an auto cleaning litter box according to embodiments of the present invention.

With regard to FIG. 16, a perspective view showing an example of the system 100 configured to control the activation of an electro-mechanical actuator 1600 associated with an auto cleaning litter box 1602 is provided according to embodiments of the present invention. In this example, it is shown how an electro-mechanical actuator 1600 associated with an auto cleaning litter box 1602 may be used in combination in response to detection of the presence of the animal 102.

Figure 17:
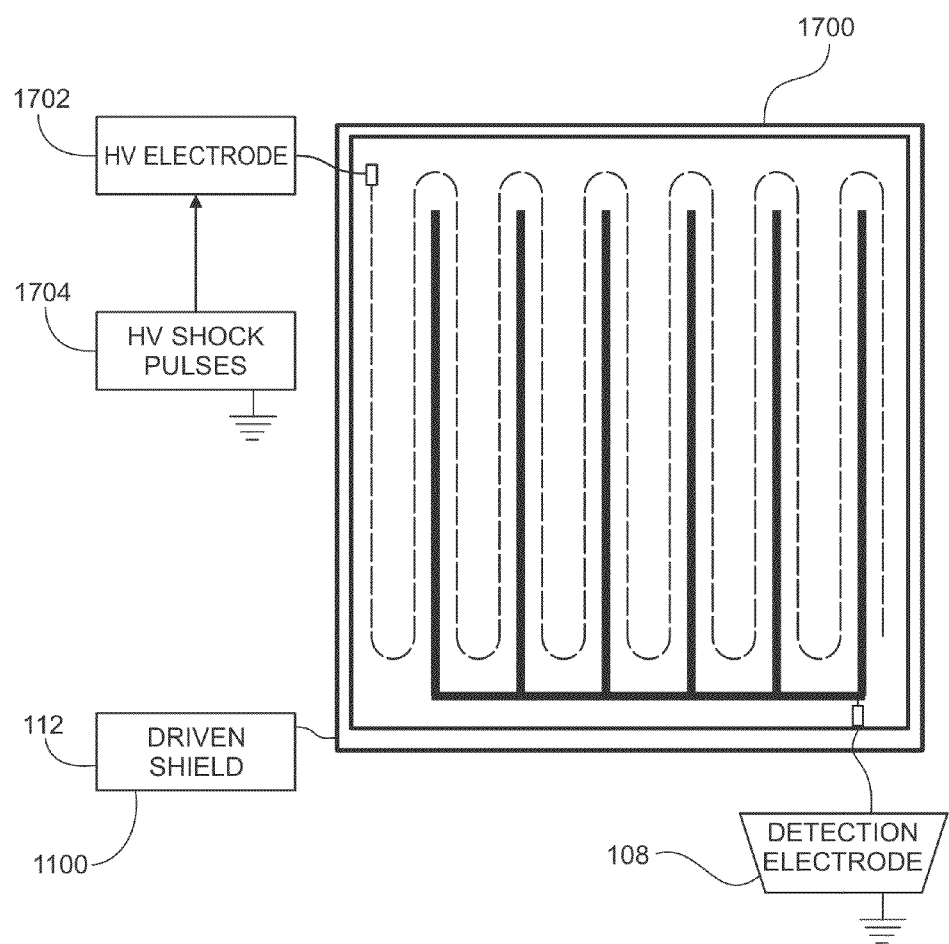
FIG. 17 is a perspective view showing a mat assembly electrically associated with the system configured to control the activation of one or more electrical shock electrodes according to embodiments of the present invention.

With regard to FIG. 17, a perspective view showing a mat assembly electrically associated with the system 100 configured to control the activation of one or more electrical shock pad 1700 is provided according to embodiments of the present invention. The electrical shock pad 1700 may be comprised of a plurality of high voltage (HV) electrodes 1702 configured to provide at least one HV shock pulses 1704.

Figure 18:
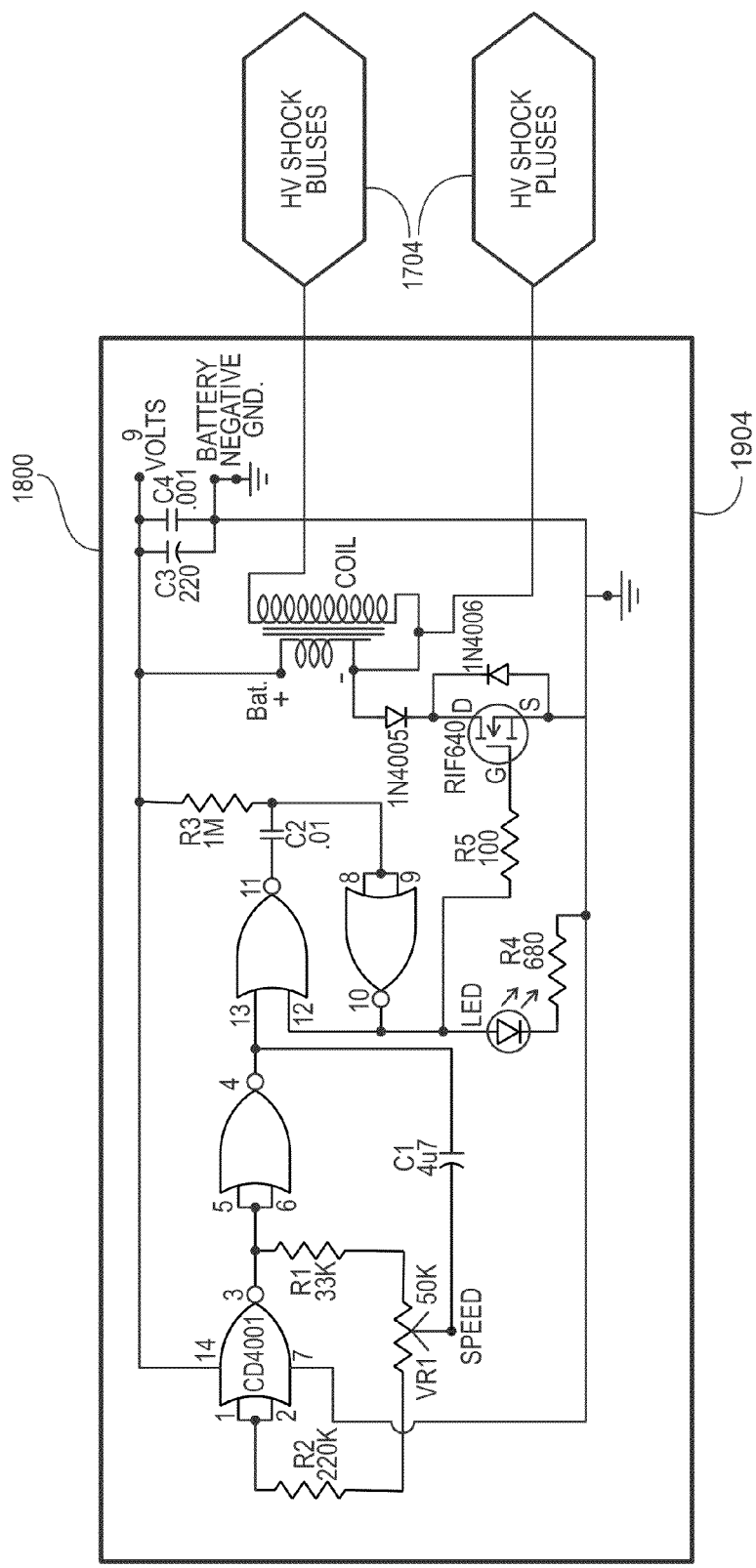
FIG. 18 is a circuit diagram showing an example of a high voltage pulse generator used to generate an electrical shock according to embodiments of the present invention.

With regard to FIG. 18, a schematic view of a pulse generating assembly 1800 is provided. The pulse generating assembly 1800, which may be battery or AC powered, provides at least one high voltage, low current electrical shock pulse to electrical shock pad 1700 or shock collar 124 as shown in FIG. 1.

Figure 19:
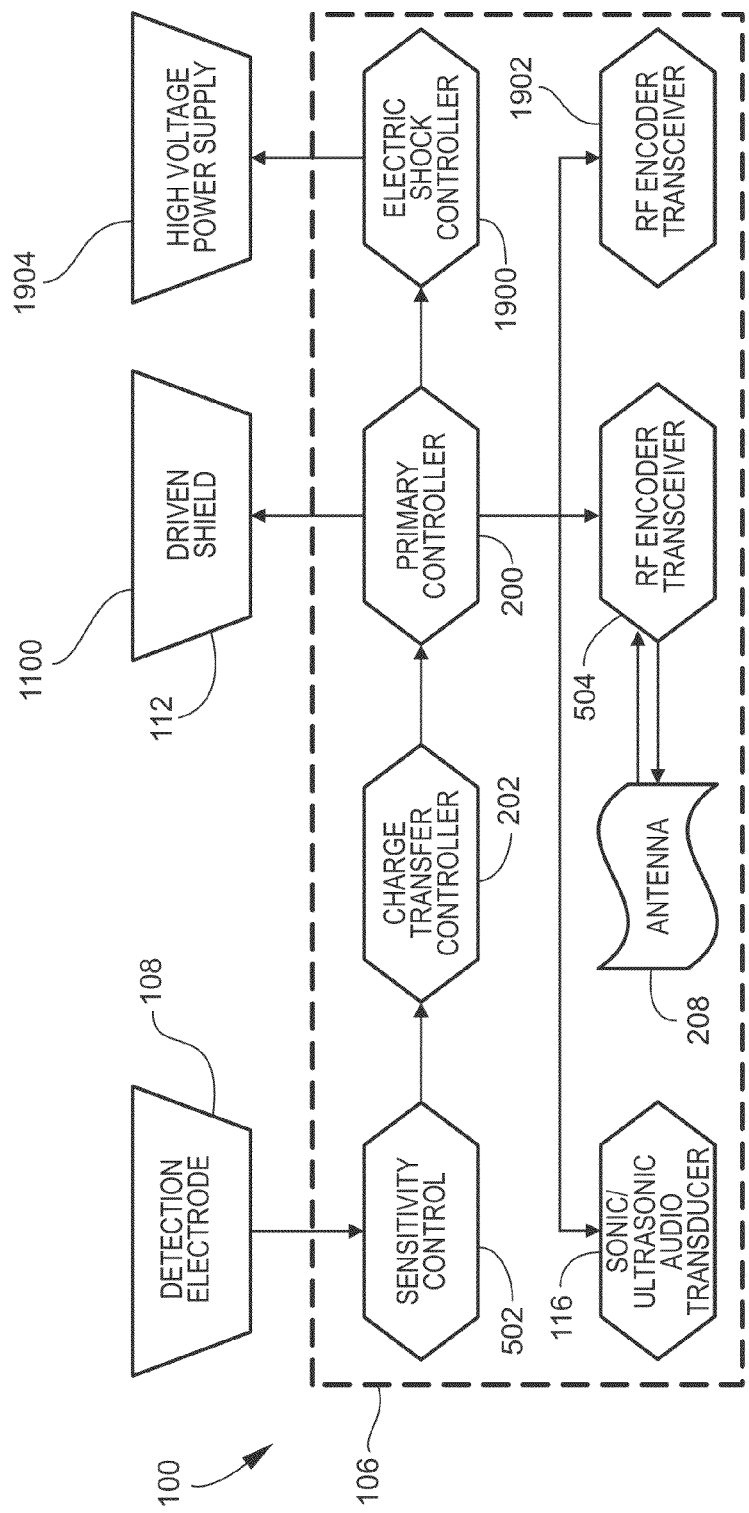
FIG. 19 is a block diagram showing an example of the system electrically associated with a detection electrode, wired or wirelessly associated with the high voltage pulse generator described in FIG. 18 according to embodiments of the present invention.

With regard to FIG. 19, a block diagram showing an example of the system 100 electrically associated with a detection electrode 108, wired or wirelessly associated with the pulse generator assembly 1800 described in FIG. 18 is provided according to embodiments of the present invention. The pulse generator assembly 1800 may also be configured to include an annunciator 116 for providing sonic or ultrasonic sounds. In this example, an embodiment may include an electrical shock controller 1900 configured to activate the pulse generator assembly 1800 electrically associated with the electrical shock pad 1700. Alternately, an IR transmitter 1902/RF transmitter 504 with antenna 208 cooperating with IR receiver 1902 or RF receiver 908 so as to remotely activate the pulse generator assembly 1800. The pulse generator assembly is coupled to the system 100 via a high voltage power supply 1904. Alternatively, the pulse generator assembly 1800 may be located on the transmitting collar device 124 and may function so as to discourage a pet's proximity to the monitored object.

Figure 20:
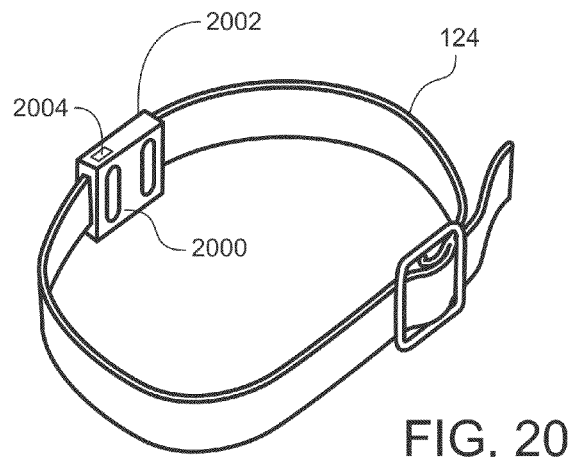
FIG. 20 is a perspective view showing a collar assembly configured to generate an electrical shock to an animal while wirelessly associated with the system that wirelessly controls the activation of electrical shock electrodes on the collar according to embodiments of the present invention.

With regard to FIG. 20, a perspective view showing the transmitting collar device 124 configured to generate an electrical shock to the animal 102 while wirelessly associated with the system 100 that wirelessly controls the activation of electrical shock electrodes 2000 on the collar is provided according to embodiments of the present invention. The electrical shock electrodes 2000 may be comprised within the electrical shock pad 1700 as described in FIG. 17. In this example, the electrical shock electrodes 2000 may be comprised in an electrical shock assembly 2002. A wireless IR link, also shown, may configured to control the activation of electrical shock electrodes. The electrical shock assembly 2002 may also comprise an IR transceiver 2004. The IR transceiver 2004 may be configured to both transmit and receive to a remote device or display, such as, the display device 800 as an example.

Figure 21:
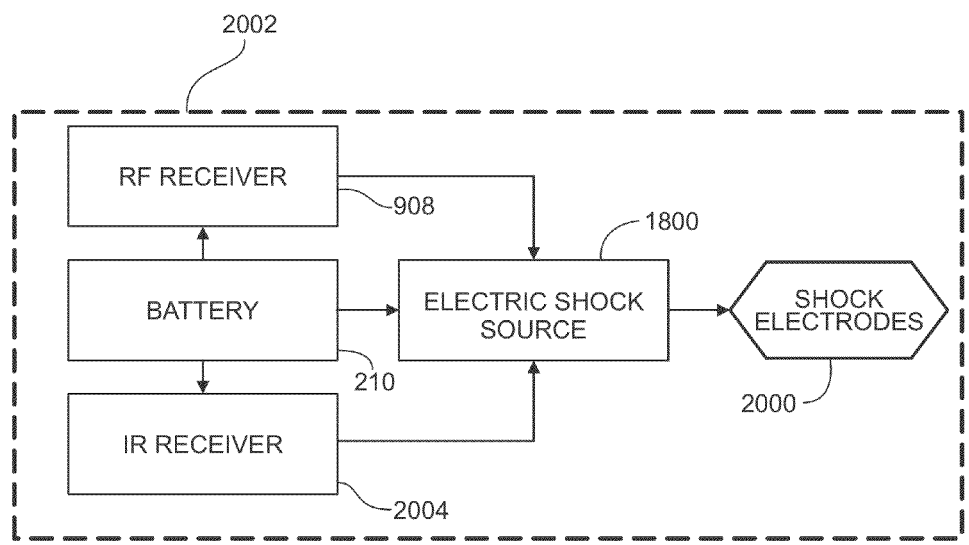
FIG. 21 is a block diagram showing an example of an electrical shock assembly located on the animal collar assembly wirelessly associated with the system configured to control the activation of shock electrodes for the purpose of modifying pet behavior according to embodiments of the present invention.

With regard to FIG. 21, the electrical shock assembly 2002 may be comprised of the RF receiver 908, the battery 210, and the IR transceiver 2004. Further the electrical shock assembly 2002 may be comprised of the pulse generating assembly 1800 and the shock electrodes 2000.

According to one aspect of the invention, a method of utilizing software in a PDA comprises receiving at the PDA a data transmission, the transmission including an identifier unique to the computing device 106, extracting the identifier from the message, comparing the identifier with the identifiers of computing device 106 already identified by the PDA, and if the computing device 106 having the received identifier is already present in memory proceeding with the preprogrammed actions associated with the received module. Advantageously, software modules may be provided which interact with the software which controls the cellular network side of the PDA.

The process of displaying information and controlling the associated electronic signals generated when reacting to the provided information as well as the recording of the provided information can be repeated many times using different computing devices 106. In embodiments of the present invention, a portable controller (e.g., personal digital assistant, wireless notepad, etc.) enables a user to interact with the system 100. Such interaction includes altering the configuration and performance of the associated system 100 associated devices and/or applications. In accordance with the present invention, the user first selects an output component via a graphical user interface (GUI) presented on the portable controller. He or she is then presented with a control screen affording the user with the ability to select a specific feedback annunciator 116 or actuator component using a "tabbed" interface. When that input is selected, the control screen for that system component is presented. Accordingly, the portable controller provides remote access to the system 100 associated devices and/or applications, thereby enabling the user to control their functions and/or operations from any location within the environment.

The length of time such activation last and a means of providing feedback to the pet or the actuation of an electromechanical mechanism affecting the animal 102 via pet owner input into the associated PDA application may vary. Although several preferred embodiments are illustrated and described above, there are possible combinations using other geometries, sensors, materials and different dimensions for the components that perform the same functions to include augmentations by olfactory, visual or audio stimuli such as aromatic attractants and repellents associated with the location of the sensor electrodes. This invention is not limited to the above embodiments and should not be solely determined by the following claims.

With regard to FIG. 22, a schematic diagram showing an example of an embodiment of projected capacitance sensed via self-capacitance is provided according to embodiments of the present invention. Projected capacitive technologies detect touch by measuring the capacitance at each addressable electrode. When the animal 102 or other conductive object approaches the detection electrode, it disturbs the electromagnetic field and alters the capacitance. This change in capacitance can be measured by the computing device 106 and then converted into X,Y locations that the system 100 can use to detect touch or presence of the animal 102. There are two main types of sensing methods, self-capacitance, as described in FIG. 22, and mutual capacitance, as described in FIG. 23, where each has its own advantages and disadvantages.

With continued reference to FIG. 22, self-capacitance uses the computing device 106 to measure the current on one or more detection electrodes to ground and therefore is called "self-capacitance". There are two options for how the computing device 106 can detect touch or proximity. The first option is with sensing a change in charge on one or more electrodes as referenced to ground. The second option is to detect the change in capacitance or charge transfer between two approximating electrodes. Additionally, a means is provided for a multi-pad construction, each multi-pad detection electrode 2200, or "pad", is individually addressable by the computing device 106 requiring an individual connection between the multi-pad detection electrode 2200 and the computing device 106. This allows multi-pad self-capacitance to support greater than one touch or provides for detection with finer resolution of proximity location, but given that each pad must be individually addressed, it makes the implementation of the solution for pads greater than four (4) to five (5) inches more complex. To sense touch in a self-capacitance implementation, the computing device 106 scans through each electrode and measures the amount of current 2202 on each electrode to establish a steady-state current. When the animal 102 or grounded conductive presence approaches the pad, the detecting electrodes are coupled and increase the current 2202 draw as it creates a path to ground.

FIG. 23 is a schematic diagram showing an example of an embodiment of projected capacitance sensed via mutual capacitance according to embodiments of the present invention. Projected capacitance is the intentional or unintentional capacitance between two "charge holding objects." Projected capacitance detection electrodes 2300 intentionally creates mutual capacitance between two or more electrodes as shown in FIG. 23. As the animal 102 touches or is present near an intersection of electrodes, some of the mutual capacitance between the electrodes is coupled to the animal 102 which reduces the capacitance at the intersection as measured by the computing device 106. This reduced capacitance crosses 2302 the "touch threshold" set by the computing device 106 indicating a touch or presence has occurred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A system comprising:
a computing device comprising at least one processor and memory;
a detection electrode; and
a signaling device; and
wherein the computing device is configured to:
    detect a change of an electrical capacitance at a detection electrode based on direct contact with the detection electrode;
    detect a change of the electrical capacitance at the detection electrode based on indirect contact with the detection electrode;
    determine a position of a conductive object based on the change in the electrical capacitance, wherein the position of the conductive object is one of the direct contact and the indirect contact with the detection electrode; and
    control the signaling device to communicate a signal in response to determining the position of the conductive object.

2. The system of claim 1, wherein the computing device is further configured to determine the conductive object is within a predetermined proximity to a second object using a charge transfer controller based on a determined capacitance at a reference capacitor reaching a predetermined value.

3. The system of claim 1, wherein the signaling device is further configured to activate a transducer based on determining the conductive object is within the predetermined proximity to the second object.

4. The system of claim 1, wherein the signaling device is configured to activate a pet shocking device based on determining the conductive object is within the predetermined proximity to the second object.

5. The system of claim 1, wherein the predetermined proximity is less than 25 centimeters.

6. The system of claim 1, further comprising a charge transfer controller configured to determine that the conductive object is within a defined area based on a determined capacitance at a reference capacitor reaching a predetermined value.

7. The system of claim 6, further comprising a transducer configured to be activated based on the determination that the conductive object is within the defined area.

8. The system of claim 6, further comprising activating a pet shocking device based on determining the conductive object is within the defined area.

9. The system of claim 1, wherein the computing device is configured to detect that a reference capacitor reaches a predetermined value for indicating a presence of the conductive object.

10. The system of claim 1, further comprising a detection electrode and a charge transfer controller that are collocated in the computing device.

11. The system of claim 1, further comprising a shield configured to protect the computing device from electrical interference.

12. The system of claim 1, wherein the signaling device is configured to release a scent in response to determining the position of the conductive object.

13. The system of claim 1, wherein the signaling device is configured to transmit the signal to a remote device.

14. The system of claim 13, wherein the signaling device is configured to receive a communication from the remote device.

15. The system of claim 1, further comprising an electro mechanical mechanism to communicate the signal.

16. The system of claim 1, wherein the signaling device is configured to transmit the signal to a portable device with an associated monitoring software application.

17. The system of claim 1, wherein the signaling device is configured to receive a communication from the remote device.

* * * * *